(12) United States Patent
Jiang et al.

(10) Patent No.: US 10,567,941 B2
(45) Date of Patent: *Feb. 18, 2020

(54) METHODS FOR MAINTAINING LINE-OF-SIGHT COMMUNICATIONS

(71) Applicant: Apple Inc., Cupertino, CA (US)

(72) Inventors: Yi Jiang, Cupertino, CA (US); Siwen Yong, Santa Clara, CA (US); Jiangfeng Wu, Santa Clara, CA (US); Lijun Zhang, San Jose, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,120

(22) Filed: Dec. 21, 2018

(65) Prior Publication Data

US 2019/0222991 A1 Jul. 18, 2019

Related U.S. Application Data

(63) Continuation of application No. 15/630,841, filed on Jun. 22, 2017, now Pat. No. 10,165,426.

(51) Int. Cl.
| | |
|---|---|
| H04B 7/04 | (2017.01) |
| H04W 16/28 | (2009.01) |
| H01Q 3/24 | (2006.01) |
| H04W 4/80 | (2018.01) |

(Continued)

(52) U.S. Cl.
CPC ............ *H04W 4/80* (2018.02); *H01Q 3/08* (2013.01); *H01Q 3/36* (2013.01); *H04W 16/28* (2013.01)

(58) Field of Classification Search
CPC ........ H04B 7/043; H04B 7/10; H04B 7/0408; H04B 7/0695; H04B 7/0802; H04B 7/088; H01Q 3/36; H01Q 3/08; H01Q 3/24; H01Q 3/2611; H04W 4/80; H04W 16/28

See application file for complete search history.

(56) References Cited

U.S. PATENT DOCUMENTS

| | | | |
|---|---|---|---|
| 7,860,473 B2 * | 12/2010 | Hardacker ........... | H04B 1/1027 455/234.2 |
| 10,165,426 B1 * | 12/2018 | Jiang .................... | H04W 16/28 |

(Continued)

*Primary Examiner* — Andrew Wendell
(74) *Attorney, Agent, or Firm* — Treyz Law Group, P.C.; Michael H. Lyons

(57) ABSTRACT

An electronic device may be provided with wireless communications circuitry and control circuitry. The wireless communications circuitry may include millimeter wave transceiver circuitry and a phased antenna array. The phased antenna array may transmit and receive millimeter wave signals. Beam steering circuitry may be coupled to the phased antenna array and may be adjusted to steer the millimeter wave signals in a particular direction. The control circuitry may track the location of an external device using sensor data. The control circuitry may control a mechanical positioner to mechanically adjust an orientation of the phased antenna array and/or may control the beam steering circuitry to steer the millimeter wave signals towards the location of the external device. In this way, a line of sight millimeter wave communications link may be maintained between the phased antenna array and the external device even if the external device moves over time.

17 Claims, 9 Drawing Sheets

(51) Int. Cl.
*H01Q 3/08* (2006.01)
*H01Q 3/36* (2006.01)

(56) References Cited

U.S. PATENT DOCUMENTS

| | | | |
|---|---|---|---|
| 2011/0260918 A1* | 10/2011 | Nguyen | H04B 7/0617 |
| | | | 342/368 |
| 2017/0272872 A1* | 9/2017 | Bauman | H04B 17/309 |
| 2019/0079176 A1* | 3/2019 | Weissman | G01S 13/751 |

* cited by examiner

METHODS FOR MAINTAINING LINE-OF-SIGHT COMMUNICATIONS

This Application is a continuation of U.S. patent application Ser. No. 15/630,841, filed on Jun. 22, 2017, which is hereby incorporated by reference herein in its entirety. This application claims the benefit of and claims priority to U.S. patent application Ser. No. 15/630,841, filed on Jun. 22, 2017.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave communications bands. Millimeter wave communications, which are sometimes referred to as extremely high frequency (EHF) communications, involve communications at frequencies of about 10-400 GHz. Operation at these frequencies may support high bandwidths, but may raise significant challenges. For example, millimeter wave communications are often line-of-sight communications and can be characterized by substantial attenuation during signal propagation.

It would therefore be desirable to be able to provide electronic devices with improved wireless communications circuitry such as communications circuitry that supports millimeter wave communications.

SUMMARY

An electronic device may be provided with wireless circuitry. The wireless circuitry may include one or more antennas and transceiver circuitry such as millimeter wave transceiver circuitry. The antennas may be organized in one or more phased antenna arrays. The phased antenna array may transmit and receive a beam of millimeter wave signals to communicate with an external device. Beam steering circuitry coupled to the phased antenna array may be adjusted to electronically steer a direction (orientation) of the beam. The electronic device may include a mechanical positioner coupled to the phased antenna array.

Control circuitry in the electronic device may align the beam of millimeter wave signals with a location of the external device by controlling the mechanical positioner to mechanically adjust the position of the phased antenna array and/or by controlling the beam steering circuitry to steer the beam of millimeter wave signals. The control circuitry may control the mechanical positioner and the beam steering circuitry concurrently or sequentially. The control circuitry may identify the location of the external device based on sensor data generated by sensor circuitry in the electronic device. In another suitable arrangement, the control circuitry may identify the location of the external device based on sensor data generated by the external device. The control circuitry may track movement of the external device over time and may mechanically adjust the position of the phased antenna array and/or perform beam steering to ensure that the beam remains aligned with the external device. In this way, a line of sight millimeter wave communications link may be maintained between the phased antenna array and the external device even as the external device moves over time (e.g., without the need for multiple resource-intensive arrays on different sides of the electronic device).

If desired, the electronic device may perform handoff operations with an additional external device when a millimeter wave communications link between the electronic device and the external device is impaired. In this scenario, the additional external device may perform millimeter wave communications with the external device.

DETAILED DESCRIPTION

Figure 1:
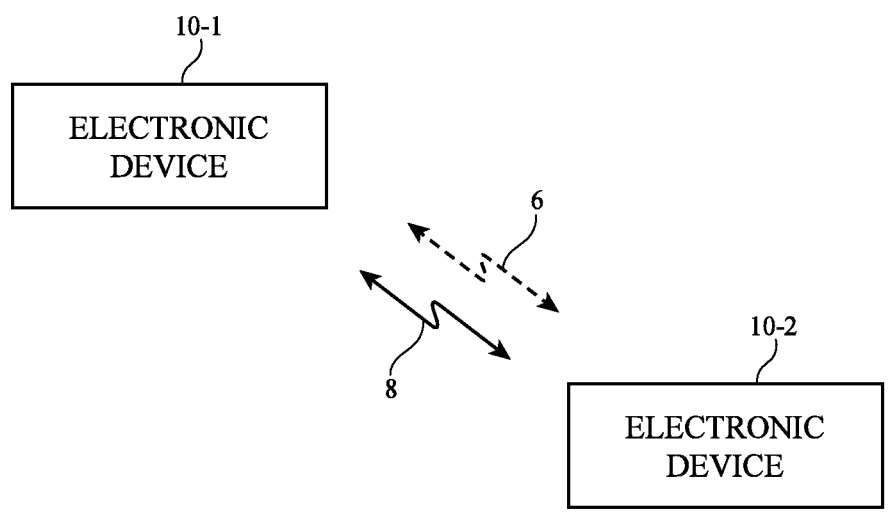
FIG. 1 is a diagram of a wireless system having first and second illustrative electronic devices that may communicate via communication links in accordance with an embodiment.

Electronic devices such as electronic devices 10-1 and 10-2 of FIG. 1 may contain wireless circuitry. The wireless circuitry may include one or more antennas. The antennas may include phased antenna arrays that are used for handling millimeter wave communications. Millimeter wave communications, which are sometimes referred to as extremely high frequency (EHF) communications, involve signals at 60 GHz or other frequencies between about 10 GHz and 400 GHz. If desired, devices 10-1 and/or 10-2 may also contain wireless communications circuitry for handling satellite navigation system signals, cellular telephone signals, local wireless area network signals, near-field communications, light-based wireless communications, or other wireless communications.

Electronic device 10-1 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station (e.g., a wireless router or other equipment for routing communications between other wireless devices and a larger network such as the internet or a cellular telephone network), a desktop computer, a keyboard, a gaming controller, a computer mouse, a mousepad, a trackpad or touchpad, equipment that implements the functionality of two or more of these devices, or other electronic equipment.

Electronic device 10-2 may sometimes be referred to herein as external device 10-2 or external equipment 10-2. External device 10-2 may be the same type of device as device 10-1 or may be a different type of device. Other configurations may be used for devices 10-1 and 10-2 if desired. For example, external device 10-2 may be a separate and distinct device from device 10-1 (e.g., external device 10-2 may include a respective housing that is separate from the housing of device 10-1, may include separate processing and input-output circuitry, etc.). In general, external device 10-2 may include any desired wireless communications circuitry that is separate from (e.g., external to) electronic device 10-1. The components of external device 10-2 need not be enclosed within a corresponding electronic device housing in some scenarios. If desired, external device 10-2 may be an accessory to device 10-1 or device 10-1 may be an accessory device to external device 10-2 (e.g., an accessory such as a remote control that provides data to device 10-1 and/or receives data from device 10-1, a wireless speaker that plays audio data generated by device 10-1, wireless headset, a wireless keyboard, wireless trackpad, wireless mouse, etc.).

In general, external device 10-2 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station (e.g., a wireless router or other equipment for routing communications between other wireless devices and a larger network such as the internet or a cellular telephone network), a desktop computer, a keyboard, a gaming controller, a computer mouse, a mousepad, a trackpad or touchpad, equipment that implements the functionality of two or more of these devices, or other electronic equipment having wireless communications capabilities.

Wireless circuitry on electronic device 10-1 may perform wireless communications with wireless circuitry on external equipment such as electronic device 10-2. As shown in FIG. 1, wireless circuitry on electronic device 10-1 may perform millimeter wave communications with wireless circuitry on electronic device 10-2 over a wireless millimeter wave link such as millimeter wave link 8. Millimeter wave link 8 may be, for example, a wireless bidirectional link over which data is conveyed from electronic device 10-1 to electronic device 10-2 and from electronic device 10-2 to electronic device 10-1 (e.g., at one or more millimeter wave frequencies). This is merely illustrative and, in another arrangement, millimeter wave link 8 may be unidirectional.

If desired, wireless circuitry on electronic device 10-1 may perform wireless communications with external equipment such as electronic device 10-2 over a non-millimeter wave link such as optional wireless link 6. Wireless link 6 may be, for example, a wireless local area network (WLAN) link such as a Wi-Fi® link or a wireless personal area network (WPAN) link such as a Bluetooth® link. Link 6 may be bidirectional or unidirectional. In general, data conveyed over link 6 may be conveyed over any desired non-millimeter wave communications band (e.g., a communications band at frequencies less than 10 GHz). Data may be conveyed over link 8 at a higher bandwidth than data conveyed over link 6, for example (e.g., because link 8 is maintained at higher frequencies than link 6). This example is merely illustrative. In another suitable arrangement, link 6 may be formed using a wired (conductive) path. In yet another suitable arrangement, link 6 may be maintained over an intervening network such as the internet (e.g., link 6 may pass through intervening network devices such as network switches and routers). Communications link 6 may be omitted if desired.

Figure 2:
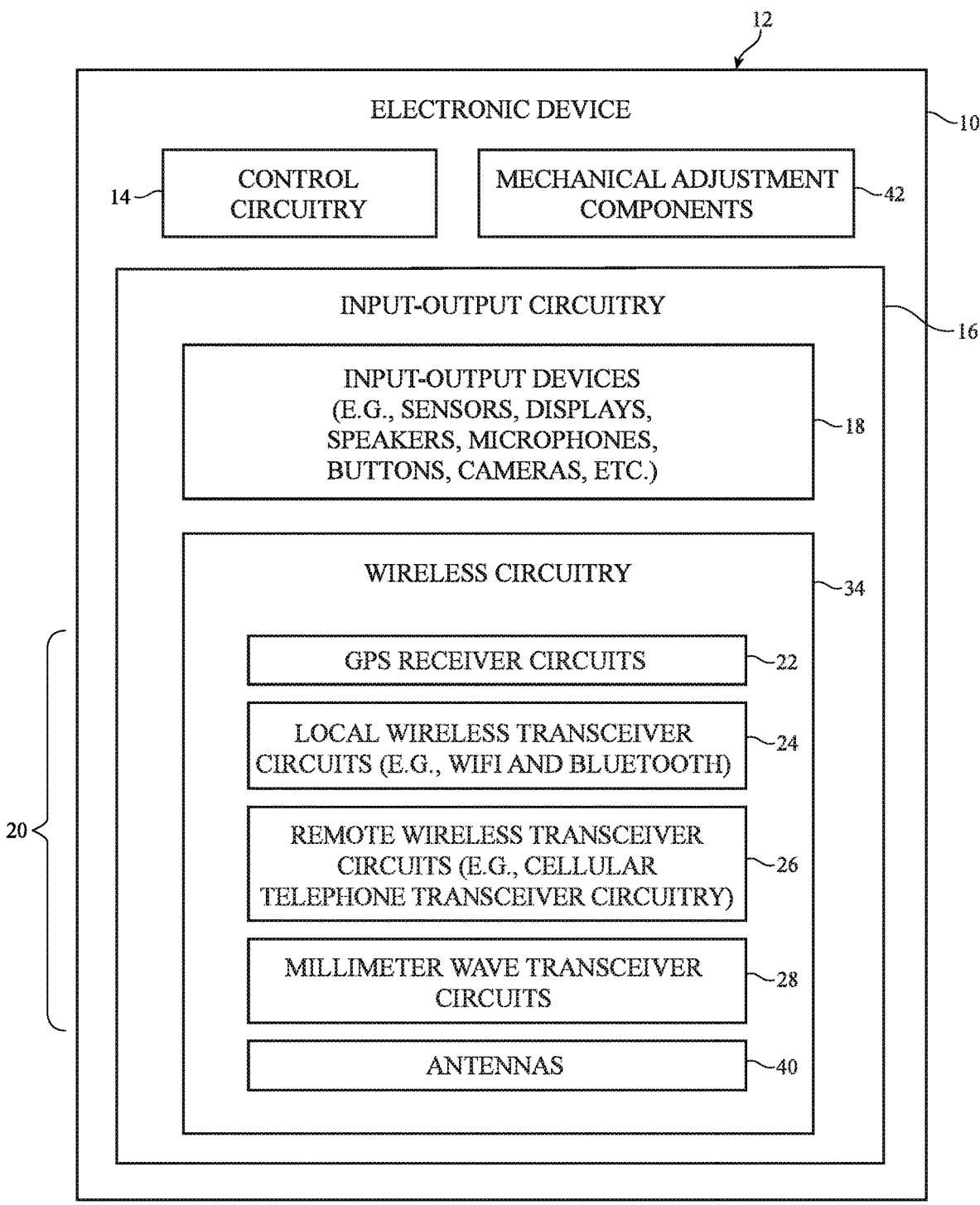
FIG. 2 is a schematic diagram of an illustrative electronic device with wireless communications circuitry in accordance with an embodiment.

A schematic diagram showing illustrative components that may be used in an electronic device such as electronic devices 10-1 and/or 10-2 of FIG. 1 is shown in FIG. 2. As shown in FIG. 2, device 10 (e.g., electronic device 10-1 and/or electronic device 10-2 of FIG. 1) may include storage and processing circuitry such as control circuitry 14. Control circuitry 14 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, baseband processor integrated circuits, application specific integrated circuits, etc.

Control circuitry 14 may be used to run software on device 10, such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, etc.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 20 for handling various radio-frequency communications bands. For example, circuitry 34 may include transceiver circuitry 22, 24, 26, and 28.

Transceiver circuitry 24 may be wireless local area network transceiver circuitry. Transceiver circuitry 24 may handle 2.4 GHz and 5 GHz bands for WiFi® (IEEE 802.11) communications and may handle the 2.4 GHz Bluetooth® communications band.

Circuitry 34 may use cellular telephone transceiver circuitry 26 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 26 may handle voice data and non-voice data.

Millimeter wave transceiver circuitry 28 (sometimes referred to as extremely high frequency transceiver circuitry) may support communications at extremely high frequencies (e.g., millimeter wave or centimeter wave frequencies such as extremely high frequencies of 10 GHz to 400 GHz or other millimeter wave frequencies). For example, circuitry 28 may support IEEE 802.11ad communications at 60 GHz. Circuitry 28 may be formed from one or more integrated circuits (e.g., multiple integrated circuits mounted on a common printed circuit in a system-in-package device, one or more integrated circuits mounted on different substrates, etc.).

Wireless communications circuitry 34 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 28 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include phased antenna arrays for handling millimeter wave communications.

As shown in FIG. 2, device 10 may include a housing such as housing 12. Housing 12, which may sometimes be referred to as an enclosure or case, may be formed of plastic, glass, ceramics, fiber composites, metal (e.g., stainless steel, aluminum, metallic coatings on a substrate, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Antennas 40 may be mounted in housing 12. Dielectric-filled openings such as plastic-filled openings may be formed in metal portions of housing 12 (e.g., to serve as antenna windows and/or to serve as gaps that separate portions of antennas 40 from each other).

In scenarios where input-output devices 18 include a display, the display may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. The display may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The display may be protected using a display cover layer such as a layer of transparent glass, clear plastic, sapphire, or other transparent dielectric. If desired, some of the antennas 40 (e.g., antenna arrays that may implement beam steering, etc.) may be mounted under an inactive border region of the display. The display may contain an active area with an array of pixels (e.g., a central rectangular portion). Inactive areas of the display are free of pixels and may form borders for the active area. If desired, antennas may also operate through dielectric-filled openings elsewhere in device 10.

Transmission line paths may be used to route antenna signals within device 10. For example, transmission line paths may be used to couple antenna structures 40 to transceiver circuitry 20. Transmission lines in device 10 may include coaxial cable paths, microstrip transmission lines, stripline transmission lines, edge-coupled microstrip transmission lines, edge-coupled stripline transmission lines, waveguide structures for conveying signals at millimeter wave frequencies, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 14 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may include antenna arrays (e.g., phased antenna arrays to implement beam steering functions). For example, the antennas that are used in handling millimeter wave signals for extremely high frequency wireless transceiver circuits 28 may be implemented as phased antenna arrays. The radiating elements in a phased antenna array for supporting millimeter wave communications may be patch antennas, dipole antennas, or other suitable antenna elements. Transceiver circuitry 28 can be integrated with the phased antenna arrays to form integrated phased antenna array and transceiver circuit modules or packages if desired.

In devices such as handheld devices, the presence of an external object such as the hand of a user or a table or other surface on which a device is resting has a potential to block wireless signals such as millimeter wave signals. In addition, millimeter wave communications typically require a line of sight between antennas 40 and the antennas on an external device. Accordingly, it may be desirable to incorporate multiple phased antenna arrays into device 10, each of which is placed in a different location within or on device 10. With this type of arrangement, an unblocked phased antenna array may be switched into use and, once switched into use, the phased antenna array may use beam steering to optimize wireless performance. Similarly, if a phased antenna array does not face or have a line of sight to an external device, another phased antenna array that has line of sight to the external device may be switched into use and that phased antenna array may use beam steering to optimize wireless performance. Configurations in which antennas from one or more different locations in device 10 are operated together may also be used (e.g., to form a phased antenna array, etc.).

To further optimize millimeter wave communications, which typically require line of sight, device 10 may include mechanical adjustment components 42 (sometimes referred to as positioner 42 or mechanical positioner 42). Mechanical adjustment components 42 may include one or more mechanically moveable (adjustable) structures that are controlled to mechanically adjust the position of antennas 40 with respect to device 10 and/or the external device (e.g., to maintain line of sight with the external device). Mechanical adjustment components 42 may be mounted on a portion of housing 12, may include portions of housing 12 (e.g., portions of housing 12 to which antennas 40 are mounted), or may be mounted at any desired location on or within device 10.

Control circuitry 14 may provide control signals to components 42 to mechanically adjust the position or orientation of one or more antennas 40 (e.g., control circuitry 14 may actuate motion of components 42 using electrical control signals that actuates a change in the orientation or position of antennas 40). For example, components 42 may mechanically adjust the orientation or position of one of antennas 40, all of antennas 40, or any other subset of antennas 40 (e.g., concurrently or simultaneously). In one suitable arrangement, antennas 40 are arranged in a phased antenna array. In this scenario, mechanical positioner 42 may mechanically adjust the position of some of the antennas in the array (e.g., particular rows or columns of antennas or any other set of antennas) or may mechanically adjust the position of the entire array at a given time.

As examples, mechanical adjustment components 42 may include fixed and/or moveable components (e.g., actuators, motors, adjustable coupling mechanisms, locking mechanisms, piezoelectric components, combinations of these, etc.) and/or interfacial moveable components such as flexures, cross-flexures, ball bearings, roller bearings, slides, etc. Components 42 may include, as examples, translational stages (e.g., a stage or mount that can be actuated to move in a translational direction), rotating stages (e.g., a stage or mount that can be actuated to move in a rotational direction), single-axis tilt stages, two-axis tilt stages, or any other platforms or stages to which antennas 40 are mounted. The stages may be electrically actuated (e.g., motorized) so that, when actuated using control signals received from control circuitry 14, the stages move to adjust the mechanical position and/or orientation of antennas 40. Control circuitry 14 may provide the control signals to control components 42 to place antennas 40 in a selected orientation/position.

Figure 3:
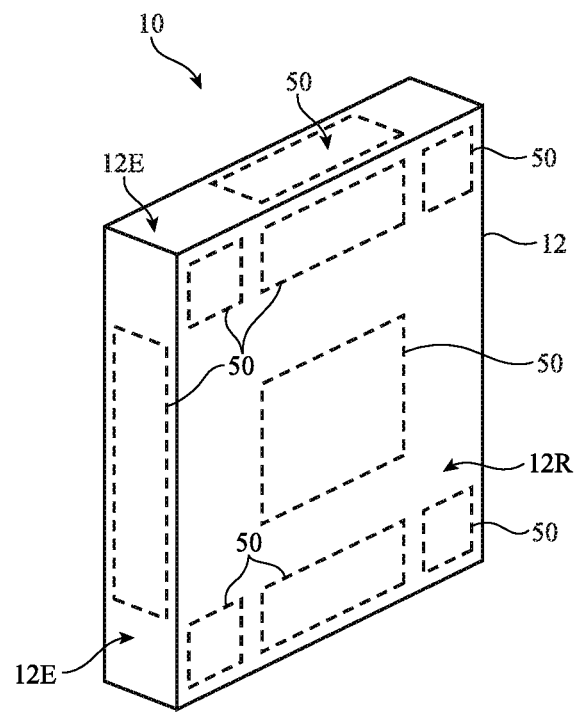
FIGS. 3 and 4 are perspective views of an illustrative electronic device showing locations at which phased antenna arrays for millimeter wave communications may be located in accordance with an embodiment.

FIG. 3 is a perspective view of electronic device 10 showing illustrative locations 50 in which antennas 40 (e.g., single antennas and/or phased antenna arrays for use with wireless circuitry 34 such as millimeter wave wireless transceiver circuitry 28) may be mounted in device 10. As shown in FIG. 3, housing 12 of device 10 may include rear housing wall 12R and housing sidewalls 12E. In one suitable arrangement, a display may be mounted to the side of housing 12 opposing rear housing wall 12R.

Antennas 40 may be mounted at locations 50 at the corners of device 10, along the edges of housing 12 such as on sidewalls 12E, on the upper and lower portions of rear housing portion 12R, in the center of rear housing 12R (e.g., under a dielectric window structure such as a plastic logo), etc. In configurations in which housing 12 is formed from a dielectric, antennas 40 may transmit and receive antenna signals through the dielectric, may be formed from conductive structures patterned directly onto the dielectric, or may be formed on dielectric substrates (e.g., flexible printed circuit board substrates) formed on the dielectric. In configurations in which housing 12 is formed from a conductive material such as metal, slots or other openings may be formed in the metal that are filled with plastic or other dielectric. Antennas 40 may be mounted in alignment with the dielectric (i.e., the dielectric in housing 12 may serve as one or more antenna windows for antennas 40) or may be formed on dielectric substrates (e.g., flexible printed circuit board substrates) mounted to external surfaces of housing 12.

Figure 4:
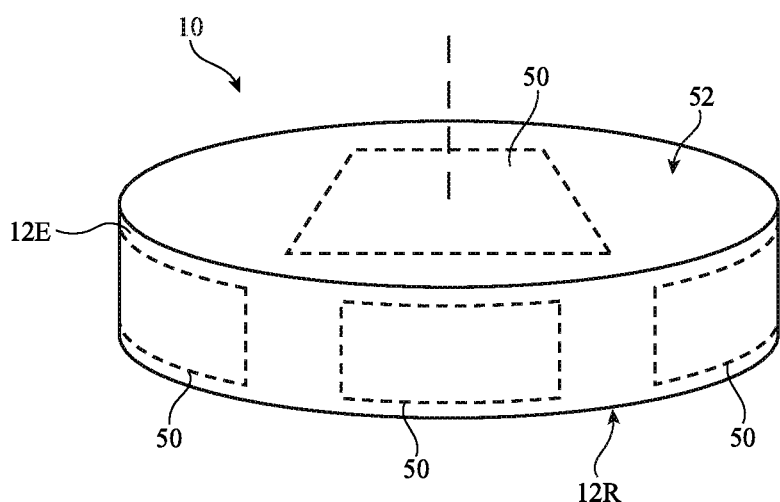

In the example of FIG. 3, rear housing wall 12R has a rectangular periphery. Housing sidewalls 12E surround the rectangular periphery of wall 12R and extend from wall 12R to the opposing face of device 10. In another suitable arrangement, device 10 and housing 12 may have a cylindrical shape. As shown in FIG. 4, rear housing wall 12R has a circular or elliptical periphery. Rear housing wall 12R may oppose surface 52 of device 10. Surface 52 may be formed from a portion of housing 12, may be formed from a display or transparent display cover layer, or may be formed using any other desired device structures. Housing sidewall 12E may extend between surface 52 and rear housing wall 12R. Antennas 40 may be mounted at locations 50 along housing sidewall 12E, on surface 50, and/or on wall 12R. By forming phased antenna arrays at different locations along wall 12E, on housing surface 52, and/or on housing surface 12R (e.g., as shown in FIGS. 3 and 4), the different phased antenna arrays on device 10 may collectively provide line of sight coverage to any point on a sphere surrounding device 10 (or on a hemisphere surrounding device 10 in scenarios where phased antenna arrays are only formed on one side of device 10).

The examples of FIGS. 3 and 4 are merely illustrative. In general, housing 12 and device 10 may have any desired shape or form factor. For example, rear housing wall 12R may have a triangular periphery, hexagonal periphery, polygonal periphery, a curved periphery, combinations of these, etc. Housing sidewall 12E may include straight portions, curved portions, stepped portions, combinations of these, etc. If desired, housing 12 may include other portions having any other desired shapes. The height of sidewall 12E may be less than, equal to, or greater than the length and/or width of housing rear wall 12R.

Figure 5:
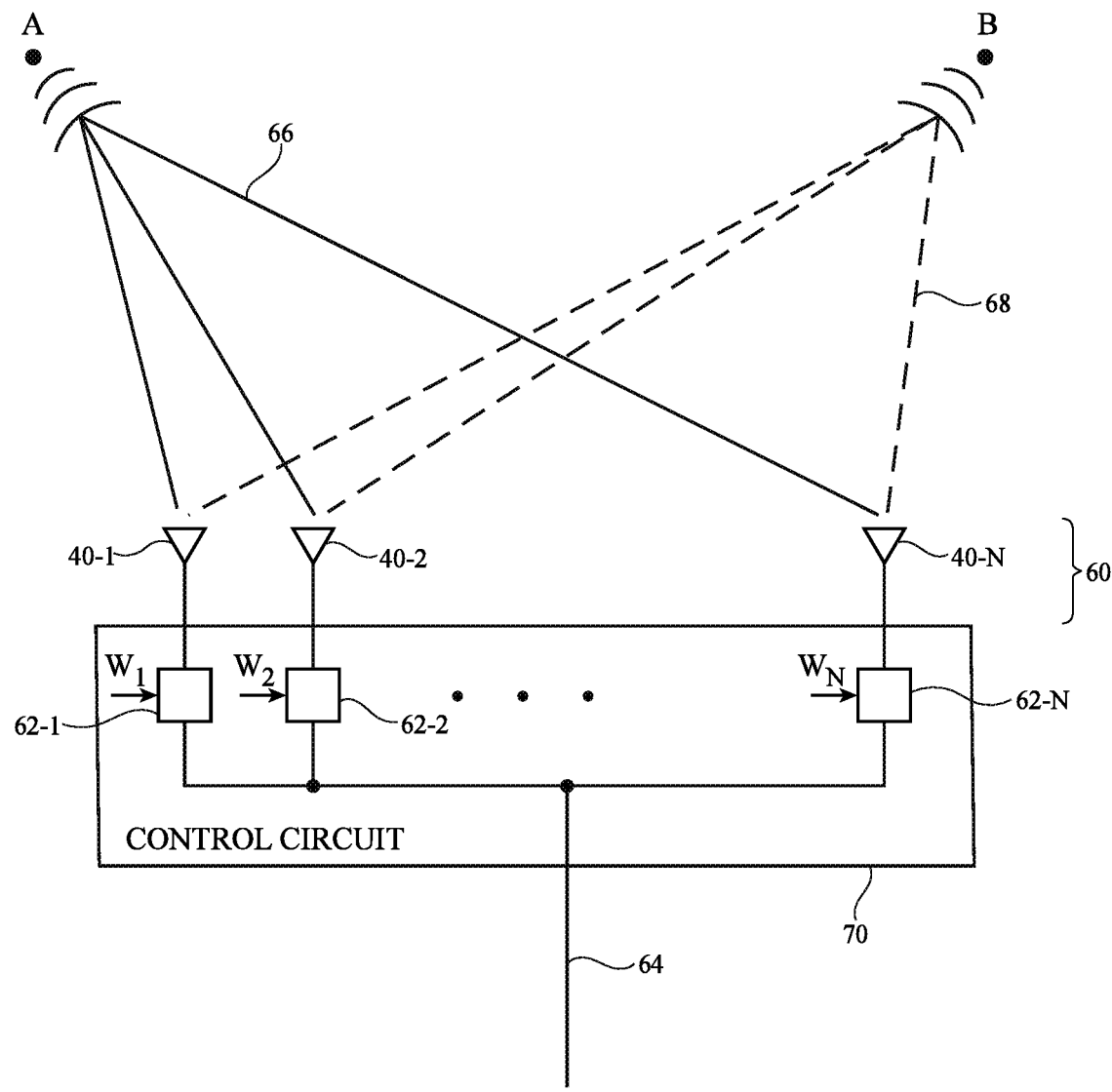
FIG. 5 is a diagram of an illustrative phased antenna array that may be adjusted using control circuitry to direct a beam of signals in accordance with an embodiment.

FIG. 5 shows how antennas 40 on device 10 may be formed in a phased antenna array. As shown in FIG. 5, an array 60 of antennas 40 may be coupled to a signal path such as path 64 (e.g., one or more radio-frequency transmission line structures, extremely high frequency waveguide structures or other extremely high frequency transmission line structures, etc.). Array 60 may include a number N of antennas 40 (e.g., a first antenna 40-1, a second antenna 40-2, an Nth antenna 40-N, etc.). Antennas 40 in phased antenna array 60 may be arranged in any desired number of rows and columns or in any other desired pattern (e.g., the antennas need not be arranged in a grid pattern having rows and columns). During signal transmission operations, path 64 may be used to supply signals (e.g., millimeter wave signals) from millimeter wave transceiver circuitry 28 to phased antenna array 60 for wireless transmission to external wireless equipment (e.g., over link 8 of FIG. 1). During signal reception operations, path 64 may be used to convey signals received at phased antenna array 60 from external equipment to millimeter wave transceiver circuitry 28.

The use of multiple antennas 40 in array 60 allows beam steering arrangements to be implemented by controlling the relative phases and amplitudes of the signals for the antennas. In the example of FIG. 5, antennas 40 each have a corresponding radio-frequency phase controller 62 (e.g., a first controller 62-1 coupled between signal path 64 and first antenna 40-1, a second controller 62-2 coupled between signal path 64 and second antenna 40-2, an Nth controller 62-N coupled between path 64 and Nth antenna 40-N, etc.).

Beam steering circuitry such as control circuitry 70 may use phase controllers 62 or any other suitable phase control circuitry to adjust the relative phases of the transmitted signals that are provided to each of the antennas in the antenna array and to adjust the relative phases of the received signals that are received by the antenna array from external equipment. The term "beam" or "signal beam" may be used herein to collectively refer to wireless signals that are transmitted and received by array 60 in a particular direction. The term "transmit beam" may sometimes be used herein to refer to wireless signals that are transmitted in a particular direction whereas the term "receive beam" may sometimes be used herein to refer to wireless signals that are received from a particular direction.

If, for example, control circuitry 70 is adjusted to produce a first set of phases on the transmitted signals, the transmitted signals will form a millimeter wave frequency transmit beam as shown by beam 66 of FIG. 5 that is oriented in the direction of point A. If, however, control circuitry 70 adjusts phase controllers 62 to produce a second set of phases on the transmitted signals, the transmitted signals will form a millimeter wave frequency as shown by beam 68 that is oriented in the direction of point B. Similarly, if control circuitry 70 adjusts phase controllers 62 to produce the first set of phases, wireless signals (e.g., millimeter wave signals in a millimeter wave frequency beam) may be received from in the direction of point A as shown by beam 66. If control circuitry 70 adjusts phase controllers 62 to produce the second set of phases, signals may be received from the direction of point B, as shown by beam 68. Control circuit 70 may be controlled by control circuitry 14 of FIG. 2 or by other control and processing circuitry in device 10 if desired. Amplifiers coupled to each phase controller may also be adjusted (e.g., provided with different bias voltages, etc.) to adjust the amplitude of the signal provided to each corresponding antenna in performing beam steering operations.

In one suitable arrangement, phase controllers 62 may each include radio-frequency mixing circuitry. Mixing circuitry in phase controllers 62 may receive signals from path 64 at a first input and may receive a corresponding signal weight value W at a second input (e.g., mixer 62-1 may receive a first weight $W_1$, mixer 62-2 may receive a second weight $W_2$, mixer 62-N may receive an Nth weight $W_N$, etc.). Weight values W may, for example, be provided by control circuitry 14 (e.g., using corresponding control signals) or form other control circuitry. The mixer circuitry may mix (e.g., multiply) the signals received over path 64 by the corresponding signal weight value to produce an output signal that is transmitted on the corresponding antenna. For example, a signal S may be provided to phase controllers 62 over path 64. Mixer 62-1 may output a first output signal $S*W_1$ that is transmitted on first antenna 40-1, mixer 62-2 may output a second output signal $S*W_2$ that is transmitted on second antenna 40-2, etc. The output signals transmitted by each antenna may constructively and destructively interfere to generate a beam of signals in a particular direction (e.g., in a direction as shown by beam 66 or a direction as shown by beam 68). Similarly, adjusting weights W may allow for millimeter wave signals to be received from a particular direction and provided to path 64. Different combinations of weights W provided to each mixer will steer the signal in different desired directions. If desired, control circuit 70 may actively adjust weights W provided to mixers 62 in real time to steer the transmit or receive beam in desired directions.

When performing millimeter wave communications, millimeter wave signals are conveyed over a line of sight path between phased antenna array 60 and external equipment. If the external equipment is located at location A of FIG. 5, circuit 70 may be adjusted to steer the signal beam towards direction A. If the external equipment is located at location B, circuit 70 may be adjusted to steer the signal beam towards direction B. In the example of FIG. 5, beam steering is shown as being performed over a single degree of freedom for the sake of simplicity (e.g., towards the left and right on the page of FIG. 5). However, in practice, the beam is steered over two degrees of freedom (e.g., into and out of the page and to the left and right on the page of FIG. 5).

Figure 6:
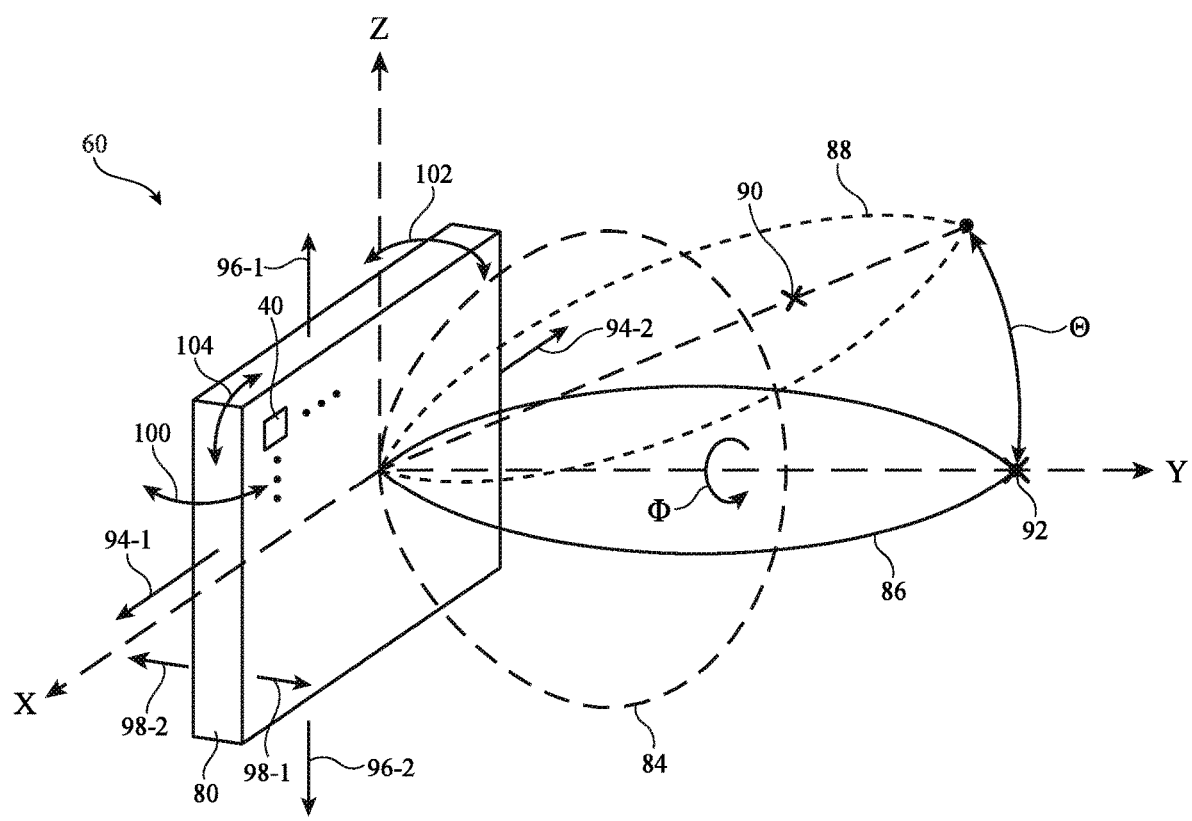
FIG. 6 is a perspective view of an illustrative phased antenna array that may be moved using mechanical adjustment components in accordance with an embodiment.

FIG. 6 is a perspective view showing how a given phased antenna array 60 may be adjusted in three dimensions (e.g., over two degrees of freedom) to maintain line of sight with external equipment. As shown in FIG. 6, phased antenna array 60 includes an array of antennas 40 on dielectric substrate 80. Dielectric substrate 80 may be a printed circuit board (e.g., a rigid or flexible printed circuit) or other dielectric material (e.g., foam, ceramic, glass, sapphire, plastic, a dielectric portion of housing 12, etc.). As an example, the antenna resonating elements of antennas 40 may be patterned onto a planar surface of dielectric substrate 80. Array 60 may include any desired number of antennas 40 (e.g., two antennas 40, three antennas 40, four antennas 40, sixteen antennas 40, between four and sixteen antennas 40, more than sixteen antennas 40, etc.).

The beam of wireless millimeter wave signals transmitted or received by array 60 may be steered to point in a desired direction (e.g., the beam may be placed in a desired orientation such as an orientation defined by angles φ and θ). In the example of FIG. 6, array 60 may have an axis y normal to the planar surface of array 40. By adjusting the phases of phase controllers 62 (FIG. 5) and the amplitude of the signal provided by corresponding amplifiers, the beam may be steered by an azimuthal angle φ (e.g., an angle φ from 0 to 360 degrees) around normal axis y and by an inclination angle θ (e.g., an angle from −90 to 90 degrees) with respect to axis y. This example is merely illustrative and, in general, any desired coordinate system may be used to represent the direction in which the beam is steered.

As the phases of phase controllers 62 are adjusted, the beam as defined by angles φ and θ is steered to point in a desired direction (e.g., towards wireless communications equipment external to device 10-1 such as external device 10-2). Storage circuitry on device 10 may store phase settings (e.g., sets of phases to provide by each phase controller 62) and corresponding amplifier settings to direct the beam in every possible or desired beam direction. The phase settings may, for example, be generated by calibrating device 10 (e.g., in a factory, manufacturing, or calibration system) over all possible angles to identify the phase and amplifier settings required to point the beam in any desired direction. Control circuitry 14 may retrieve the corresponding settings to use to point the beam in a selected direction during normal millimeter wave communications operations.

In the example of FIG. 6, some possible millimeter wave beams handled by array 60 are illustrated using beam sectors such as sectors 84, 86, and 88 (sometimes referred to herein as antenna sectors or antenna beam sectors). Sectors 84, 86, and 88 may be polar-coordinate representations of the radiation pattern of array 60 under different phase configurations. Different phase configurations may provide the beam with different levels of angular spread (in addition to pointing the beam in different directions). For a given transmit power level, the greater angular spread that is provided to the beam, the less the gain is for the beam (e.g., because the power of the millimeter wave signals is spread across a greater amount of area with respect to array 60). Similarly, the less angular spread that is provided to the beam, the more gain is provided for the beam. The angular spread of sectors such as sectors 84, 86, and 88 may be indicative of the angular spread of the beam. Similarly, the maximum distance of sectors 84, 86, and 88 relative to array 60 may be indicative of the gain of the beam.

In the example of FIG. 6, phased antenna array 60 may configure phase controllers 62 and corresponding amplifiers to provide the beam with a relatively large angular spread and low gain, as shown by sector 84, or may configure phase controllers 62 to provide the beam with a relatively small angular spread and high gain, as shown by sectors 86 and 88. Similarly, adjusting the configuration of controllers 62 may also point the beam in different desired directions. Sectors such as sectors 84, 86, and 88 may sometimes be used herein to describe the characteristics of millimeter wave beams that are transmitted or received by array 60 (e.g., in a particular direction, with a particular angular spread, and with a particular gain). The example of FIG. 6 is merely illustrative. In general, the sectors of array 60 such as sectors 88, 86, and 84 may have any desired shape (e.g., a shape characteristic of the radiation pattern of array 60 under different phase controller settings). If desired, device 10 may include multiple arrays 60 located at different locations (e.g., at multiple locations 50 as shown in FIGS. 3 and 4) to provide device 10 with a full sphere or hemisphere of antenna coverage around device 10.

In general, higher gain beams may allow for a higher average signal-to-noise ratio at the receiving device than lower gain beams. Similarly, higher average signal-to-noise ratios may allow for higher overall data rates for the receiving device than lower average signal-to-noise ratios. Over time, device 10 may support an increasing number of data hungry applications and technologies having relatively high data throughput requirements. In order to support such applications and technologies having high data throughput requirements, device 10 may perform millimeter wave communications using relatively high gain beams such as the beams associated with sectors 86 and 88 of FIG. 6. When an external device is at location 92, a beam such as a beam within sector 86 may be used to communicate with the external device with a relatively high data throughput (e.g., over a high data rate link such as millimeter wave link 8 of FIG. 1 having a data rate of 1 MBps or higher). However, if the external device moves away from location 92, the external device may move out of the relatively narrow area of coverage (i.e., the relatively narrow angular spread) of sector 86. If care is not taken, this may generate errors in the data conveyed between device 10 and the external device and/or the wireless connection may be dropped.

In order to maintain millimeter wave link 8 with the external device as the external device moves over time, once the external device moves out of the area of coverage of the beam (e.g., out of the area of angular spread of the corresponding sector), control circuitry 14 on device 10 may steer the beam towards the new location of the external device. In the example of FIG. 6, the external equipment may move from location 92 to location 90. Control circuitry 14 may thereby adjust phase controllers 62 to steer the beam towards location 90 as shown by sector 88. Data may then continue to be conveyed between the devices without introducing errors in the data or dropping the wireless link.

In practice, the field of view of array 60 is limited. The field of view of array 60 may be defined as the possible area of beam coverage for array 60 using only beam steering. In the example of FIG. 6, the field of view for array 60 may include all angles φ between 0 and 360 degrees and all angles θ between −90 and 90 degrees, or some subset of that total area. While performing millimeter wave communications, the external device may move to a location that is outside of the field of view of array 60. In some scenarios, device 10 may use additional arrays (e.g., other arrays that cover areas in the full sphere of coverage around device 10 not covered by a given array 60) to maintain communications with the external device as it moves outside of the field of view of a given array. However, in general, forming additional arrays on device 10 may consume excessive power and processing resources for device 10. If desired, mechanical adjustment components 42 may mechanically adjust the position and/or orientation of array 60 to point in a desired direction such as the direction of the external device after the external device has moved outside of the initial field of view of the array. This may allow a single array 60 to cover a greater angular area around device 10 than would otherwise be available using only beam steering. This may also allow device 10 to perform millimeter wave communications with the external device as the external device moves relative to device 10 using less power and fewer processing resources than in scenarios where multiple arrays are formed on device 10.

In order to maintain millimeter wave link 8 with the external device, control circuitry 14 may track the position and/or orientation of the external device (e.g., relative to device 10) using sensor data generated by input-output devices 18 (e.g., sensor circuitry) on device 10. Alternatively, control circuitry 14 may track the position and/or orientation of the external device using sensor data received from the external device. If desired, the sensor data generated by device 10 may be used in combination with the sensor data generated by the external device. In general, control circuitry 14 may generate sensor data from any suitable source to assist in tracking the position and/or orientation of the external device. As examples, light sensors, impedance sensors, wireless performance metric sensors, motion detectors, proximity sensors, magnetic sensors, optical cameras, infrared cameras, etc. on device 10 may generate sensor data identifying the position and orientation of the external device relative to device 10 at any desired time interval. If desired, the position of the external device may be tracked continuously or in response to a stimulus (e.g., when tracking is enabled, when motion of the external device is detected, etc.). As another example, the external device may transmit location data (e.g., GPS data) identifying the location of the external device to device 10 via a communication link such as non-millimeter wave link 6.

Control circuitry 14 on device 10 may steer the beam towards the new location of the external device based on the sensor data generated by device 10 and/or the external device (e.g., by adjusting phase controllers 62). If desired, control circuitry 14 may additionally or alternatively control mechanical adjustment components 42 to reposition or reorient array 60 towards the new location of the external device based on the sensor data generated by device 10 and/or the external device. In the example of FIG. 6, the external equipment may move from location 92 to location 90. Control circuitry 14 may thereby adjust phase controllers 62 to steer the beam towards location 90 as shown by sector 88. If desired, control circuitry 14 may actuate mechanical adjustment components 42 to move (e.g., tilt) substrate 80 towards location 90 instead of or in addition to steering the beam towards location 90. Data may continue to be conveyed between the devices without introducing errors in the data or dropping the wireless link.

Mechanical positioner 42 may adjust the mechanical position of array 60 relative to device 10 and/or the external device using translational and/or rotational motion. For example, control circuitry 14 may control positioner 42 to mechanically translate array 60 in one or more directions such as along the x-axis of FIG. 6 (as shown by arrows 94-1 and 94-2) and along the z-axis (as shown by arrows 96-1 and 96-2). If desired, control circuitry 14 may control positioner 42 to translate substrate 80 along the y-axis (as shown by arrows 98-1 and 98-2). By translating the position of array 60 along one, two, or three axes, positioner 42 may translate the position of array 60 in any desired direction (e.g., in a diagonal direction).

If desired, control circuitry 14 may control positioner 42 to provide rotational motion to array 60. For example, control circuitry 14 may control positioner 42 to rotate (tilt) array 60 about the z-axis, as shown by arrow 100. Control circuitry 14 may control positioner 42 to rotate array 60 about the x-axis, as shown by arrow 102. Control circuitry 14 may control positioner 42 to rotate array 60 about the y-axis, as shown by arrow 104. This example is merely illustrative and, in general, positioner 42 may rotate or adjust the position of array 60 around any desired axis using any desired degrees of freedom. By rotating array 40 in one, two, and/or three of directions 100, 102, and 104, control circuitry 14 may control the mechanical orientation of array 60 to point in any desired direction (e.g., in the direction of the external device). Rotation in directions 102 and 100 may be performed about a point within array 60 or about a point external to array 60. For example, array 60 may be attached to a rotating portion of housing 12 or to other device structures that rotate about the center of device 10 or about some other point within device 10. In another suitable arrangement, rotation as shown by arrows 100 and 102 may be performed about any desired point within array 60.

For example, rotation in direction 102 may involve moving both the top and bottom edges of array 60 in opposite directions or may involve moving one of the top or bottom edges of array 60 in a particular direction while the other edge remains stationary. Similarly, rotation in direction 100 may involve moving the left and right edges of array 60 in opposite directions or may involve moving one of the left or right edges of array 60 in a particular direction while the other edge remains stationary. Device 10 itself may be rotated to adjust the orientation of array 60 in direction 100, 102, and/or 104 if desired. For example, positioner 42 may include a fixed stage may be mounted to a moveable portion of device 10 (e.g., a moveable portion of housing 12, additional mechanical adjustment components). The moveable portion of device 10 may be configured for circular movement about a central axis of device 10. As such, while array 60 may be mounted to a fixed stage, the moveable portion of device 10 may still adjust the orientation of array 60. In other words, portions of device 10 may rotate to adjust the orientation of array 60. As another example, positioner 42 may include a rotating stage mounted on a fixed support structure attached to device 10 (e.g., attached to a portion of housing 12). The rotating stage may rotate about a central axis of the support structure or a point or axis within device 10 to adjust the orientation of array 60. These examples are merely illustrative.

The example of FIG. 6 in which mechanical positioner components 42 adjust the orientation of the entire array 60 is merely illustrative. If desired, positioner components 42 may adjust the orientation of any desired subset of the antennas 40 within array 60 (e.g., positioner 42 may mechanically adjust an individual antenna 40 in array 60, an entire row or column of antennas 40 in array 60, or any other desired subset of the antennas in array 60). As examples, positioner components 42 may adjust the position and orientation of the antenna resonating elements in one or more antennas 40, the antenna ground plane in one or more antennas 40, or the entirety of one or more antennas 40 within array 60 (e.g., in directions 102, 104, 100, 96-1, 96-2, 98-1, and/or 98-2). Such mechanical adjustments to antennas 40 may be performed in addition to or instead of performing beam steering operations using beam steering circuitry 70 of FIG. 5. If desired, device 10 may include any number of fixed and moveable structures that adjust the orientation and/or position of array 60, substrate 80, and/or individual antennas 40 in array 60. If desired, positioner 42 may mechanically adjust each antenna 40 individually without moving substrate 80 or may mechanically adjust different respective substrates that are coupled to each antenna 40 (e.g., each antenna 40 in array 60 need not be formed on the same dielectric substrate 80).

Consider one example in which the external device moves from location 92 to another location along the positive z-axis of FIG. 6 (and potentially out of the current field of view of array 60). In this example, control circuitry 14 may identify the change in position of the external device and may control positioner 42 to rotate array 60 about the x-axis as shown by arrows 102 until the external device is located within the area of coverage of array 60. Control circuitry 14 may rotate array 60 until the external device is located within the beam of the array (e.g., without also performing beam steering) or control circuitry 14 may rotate array 60 until array 60 is pointed at the external device (e.g., the external device is within the field of view of the rotated array 60) and may then perform beam steering (e.g., by adjusting beam steering circuitry 70) until the beam is pointed towards the external device. As another example, control circuitry 14 may adjust positioner 14 to translate array 60 in the positive direction along the z-axis (as shown by arrow 96-1) until the beam overlaps the new location of the external device.

In general, any desired combination of mechanical adjustments (e.g., translation and/or rotation) and beam steering (e.g., adjustments to phase controllers 62 and corresponding amplifiers) may be performed to maintain millimeter wave link 8. In another suitable arrangement, device 10 may include multiple arrays 60 formed on respective substrates 80 (e.g., on different sides of device 10). In this example, combinations of mechanical adjustments and beam steering adjustments may be performed for each array to maintain millimeter wave link 8 with one or more external devices as the external devices move relative to device 10 over time.

In practice, device 10 may have no direct knowledge of the new (current) location of the external device immediately after the external device moves out of the region of coverage of the beam. In order to determine where to steer the beam or where to direct array 60 (using positioner 42) to maintain communications with the external device, device 10 may track the location of the external device using sensor data generated by input-output devices 18 and/or sensor data or other data such as GPS data generated by the external device.

Figure 7:
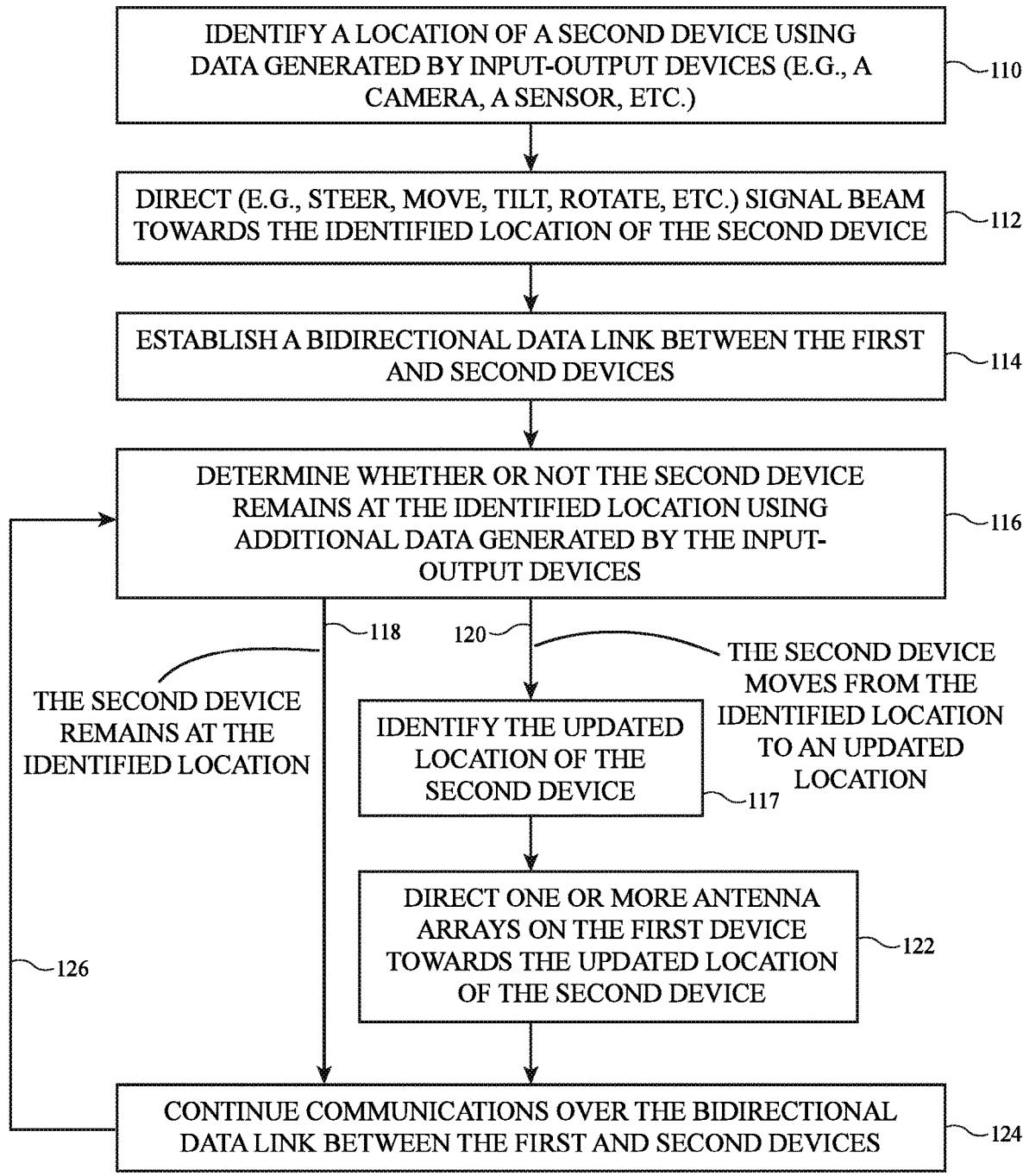
FIG. 7 is a flow chart of illustrative steps that may be performed by an electronic device in establishing a line-of-sight communication link with an external device in accordance with an embodiment.

FIG. 7 is a flow chart of illustrative steps that may be processed by an electronic device in establishing and maintaining millimeter wave link 8 with an external device. The steps of FIG. 7 may, for example, be performed by an electronic device 10 such as device 10-1 in communicating with an external device such as external device 10-2 of FIG. 1. Devices 10-1 and 10-2 may sometimes be referred to herein as a device pair (e.g., a pair of devices, between which it may be desirable to establish one or more communication links). Device 10-1 and 10-2 may each include one or more phased antenna arrays 60.

At step 110, device 10-1 may identify a location of external device 10-2. For example, device 10-1 may identify the location of external device 10-2 using sensor circuitry such as one or more cameras, optical sensors, infrared sensors, etc. The sensor circuitry may generate sensor data (e.g., image data or video data generated by an image sensor in a camera) that identifies the location of external device 10-2. The sensor data may, if desired, include device orientation data generated by orientation sensor circuitry such as an inertial measurement unit to identify a change in orientation of device 10-1. Inertial measurement units may include, for example, accelerometers that measure the orientation of the Earth's gravitational field and that can therefore measure the orientation and motion of device 10-1, may include gyroscopes (gyroscopic sensors) that measure motion device 10-1 (e.g., angular motion), and/or sensors such as compasses (e.g., magnetic sensors, sometimes referred to as magnetometers) that measure orientation and that can therefore measure device movement. Inertial measurement units (e.g., microelectromechanical systems sensors) that include 3-axis accelerometer sensors, 3-axis gyroscopes, and 3-axis compasses may be used, for example. The device orientation sensor circuitry may generate device orientation data indicative of the orientation or motion of device 10-1. Control circuitry 14 may use the device orientation data to identify a change in orientation of device 10-1. Control circuitry 14 may identify the relative location of external device 10-2 with respect to device 10-1 based on the orientation data and/or other sensor data such as image sensor data. For example, if device 10-1 determines that device 10-1 has rotated by 180 degrees, control circuitry 14 may identify the location of external device 10-2 as being shifted 180 degrees away from the previous location of external device 10-2 (assuming device 10-2 itself has not moved with respect to device 10-1). As another example, device 10-1 may include LIDAR circuitry (i.e., light detection and ranging circuitry) or any other desired type of tracking device for tracking the location of external device 10-2. As yet another example, device 10-1 may include sonic or ultrasonic tracking circuitry (e.g., sound navigation and ranging circuitry). If desired, device 10-1 may identify the location of external device 10-2 using location data (e.g., GPS data) received from external device 10-2 over link 8 and/or link 6 (FIG. 1).

In another suitable arrangement, control circuitry 14 may control array 60 to sweep over all possible angles around device 10 (e.g., using mechanical and beam steering adjustments) in a process sometimes referred to herein as beam scanning or beam sweeping operations. At each angle in the beam sweeping operation, control circuitry 14 may gather wireless performance metric data indicative of the performance of array 60 at that orientation. Control circuitry 14 may process the wireless performance metric information from each angle in the beam sweeping operation to identify the location (e.g., angle with respect to device 10-1) at which external device 10-2 is located. In general, any desired combination of these types of data and other data indicative of the relative position of external device 10-2 with respect to device 10-1 may be used.

At step 112, device 10-1 may direct the signal beam towards the identified location of external device 10-2. Device 10-1 may direct the signal beam towards the identified location of external device 10-2 by mechanically adjusting substrate 80 of array 60 (e.g., rotating and/or translating the position of substrate 80), mechanically adjusting one or more antennas 40 within array 60, and/or by steering the beam of array 60. For example, control circuitry 14 may actuate mechanical adjustment components 42 so that the field of view (potential coverage area) of a given array 60 on device 10-1 overlaps with the identified location. Control circuitry 14 may then electronically steer the beam associated with the phased antenna array 60 toward the identified location of external device 10-2. In another suitable arrangement, control circuitry 14 may actuate mechanical adjustment components 42 so that the current signal beam overlaps with the identified location (e.g., without performing beam steering operations). Control circuitry 14 may actively transmit millimeter wave signals (e.g., probe or test signals) or may adjust phase controllers 62 without actively transmitting millimeter wave signals during this operation. Control circuitry 14 may the perform beam steering prior to, concurrent with, and/or after mechanically adjusting the position/orientation of array 60 using components 42.

At step 114, once the beam of array 60 has been mechanically and/or electronically directed towards external device 10-2, device 10-1 may establish (or re-establish) a bidirectional data link with external device 10-2. Device 10-1 may transmit wireless data to external device 10-2 over link 8 (e.g., a stream or sequence of data packets at millimeter wave frequencies) and may receive wireless data from external device 10-2 over link 8. Data received from external device 10-2 may include acknowledgement data packets (e.g., data packets acknowledging receipt at device 10-1 of corresponding data packets transmitted by external device 10-2), handshake data packets, or any other desired data, as an example. The signal quality of bidirectional link 8 may be dependent upon maintenance of a line of sight between array 60 and external device 10-2 (e.g., dependent upon external device 10-2 remaining within the beam). Device 10-1 may track the current location of external device 10-2 (e.g., using sensor data or other information about the position of external device 10-2) at regular intervals (e.g., continuously, at 1 second intervals, at 100 millisecond intervals, etc.) while communicating with external device 10-2 over link 8. If desired, control circuitry 14 may monitor the signal quality of link 8 by gathering wireless performance metric data associated with millimeter wave link 8.

The wireless performance of devices 10-1 and 10-2 (e.g., the quality of millimeter wave link 8) may be characterized by one or more wireless performance metrics (e.g., radio-frequency or extremely high frequency performance metrics). Device 10-1 (e.g., control circuitry 14, baseband processor circuitry in wireless circuitry 34, or other circuitry on device 10-1) may obtain data associated with wireless performance metrics. For example, device 10-1 may generate wireless performance metric data and/or may receive wireless performance metric data from external device 10-2 (e.g., over millimeter wave link 8 and/or non-millimeter wave link 6 of FIG. 1).

As examples, device 10-1 may obtain wireless performance metric data associated with wireless performance metrics such as received power, receiver sensitivity, receive band noise (e.g., a receive band noise floor voltage level), frame error rate, bit error rate, packet error rate, channel quality measurements based on received signal strength indicator (RSSI) information, adjacent channel leakage ratio (ACLR) information (e.g., ACLR information in one or more downlink frequency channels), channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from device 10-2, information on whether a network access procedure has succeeded, information about how many re-transmissions are being requested over link 8 between devices 10-1 and 10-2, information on whether a loss of signaling message has been received, information on whether paging signals have been successfully received, Error Vector Magnitude (EVM), output power, spectral parameters, performance metrics associated with radio-frequency power amplifier circuitry on devices 10-1 or 10-2 such as amplifier compression and efficiency, any desired combination of these performance metrics, rates of change over time of these performance metrics, and other information that is reflective of the performance of wireless circuitry on device 10-1 and/or device 10-2. In general, wireless performance metric data may include data associated with any desired performance metric for the transmission or reception of millimeter wave signals by wireless communications circuitry 34 and/or device 10-2. Wireless performance metric data may, for example, include performance metric values measured for a given performance metric (e.g., measured packet error rate values, measured power level values, measured SNR values, measured ACLR values, measured receive band noise floor level values, measured RSSI values, etc.). Control circuitry 14 may store gathered wireless performance metric data on storage circuitry (e.g., within one or more data structures stored on memory, etc.).

At step 116, control circuitry 14 may determine whether or not external device 10-2 remains at the previously identified location (e.g., using sensor data or other information about the position of external device 10-2 such as described in connection with step 110 and/or using wireless performance metric data). If device 10-1 determines that external device 10-2 remains at the same location (e.g., at the location identified while processing step 110), processing may proceed to step 124 as shown by path 118. In such a scenario, device 10-1 and device 10-2 may continue communications over bidirectional millimeter wave link 8. Control circuitry 14 may continue to track the location of external device 10-2 (e.g., while looping back to step 116 as shown by path 126). If control circuitry 14 determines that external device 10-2 has moved away from the previously identified location (e.g., the location identified while processing step 110), processing may proceed to step 117 as shown by path 120. As examples, control circuitry 14 may identify that external device 10-2 has left the previously identified location (e.g., the location to which the array and beam are currently pointed) when control circuitry 14 receives GPS data from external device 10-2 identifying that device 10-2 has moved, identifies that device 10-2 has moved from camera data generated by device 10-1, identifies that the orientation of device 10-1 has moved from orientation data generated by device 10-1, etc.

In another suitable arrangement, control circuitry 14 may identify whether external device 10-2 remains at the previously identified location using gathered wireless performance metric data. In this scenario, control circuitry 14 may periodically or continuously compare the gathered wireless performance metric data to predetermined wireless performance criteria such as a predetermined range of acceptable performance metric data values. The predetermined range of acceptable performance metric values may be defined by one or more wireless performance metric threshold values (e.g., the range of acceptable performance metric values may be less than a maximum performance metric threshold value and/or greater than a minimum performance metric threshold value). The predetermined range of acceptable values need not have both maximum and minimum threshold values. For example, the predetermined range of acceptable values may include any packet error rate values less than a maximum threshold packet error rate value, any receive power level value greater than a minimum receive power level value, etc.

Wireless performance metric data within the predetermined range of acceptable values may be indicative of satisfactory link quality for millimeter wave link 8 (e.g., indicating that external device 10-2 has not move from the previously identified location). If the link quality is satisfactory, processing may proceed via path 118. Wireless performance metric data outside of the predetermined range of acceptable values may be indicative of unsatisfactory link quality for millimeter wave link 8 (e.g., indicating that external device 10-2 has moved significantly from the previously identified location). If the link quality is unsatisfactory, processing may proceed via path 120 in this example.

At step 117, device 10 may identify an updated location of external device 10-2 (e.g., using sensor data, other data identifying the position of external device 10-2, and/or wireless performance metric data such as described in connection with step 110). As one example, orientation data generated by device 10-1 may identify the updated location of external device 10-2 relative to device 10-1 given a change in orientation of device 10-1. As another example, camera data captured by device 10-1 may identify the updated location of external device 10-2. As another example, control circuitry 14 may perform a sector sweep through different beam angles while gathering wireless performance metric data. Circuitry 14 may process the performance metric data to identify the location of external device 10-2. As one example, circuitry 14 may compare the gathered performance metric data to the predetermined range of acceptable values at each of the sectors in the sweep and may identify a sector at which the performance metric data lies within the predetermined range as the updated location of external device 10-2.

At step 122, control circuitry 14 may direct antenna array 60 on device 10-1 towards the identified location of external device 10-2 (e.g., as identified while processing step 117) using any desired combination of beam steering and mechanical adjustments.

At step 124, device 10-1 may continue communications with external device 10-2 over the bidirectional millimeter wave data link. Processing may subsequently loop back to step 116 as shown by path 126 to continuously or periodically determine whether or not external device 10-2 has moved from the most recently identified/updated location.

The steps of FIG. 7 may be performed by device 10-1 in transmitting and/or receiving millimeter wave signals (e.g., because link 8 is bidirectional). The steps of FIG. 7 may also be performed by external device 10-2 prior to, concurrent with, or after device 10-1 performs the steps of FIG. 7 (e.g., because the antenna arrays on both devices need to be directed towards the other device even as the devices move over time).

Figure 8:
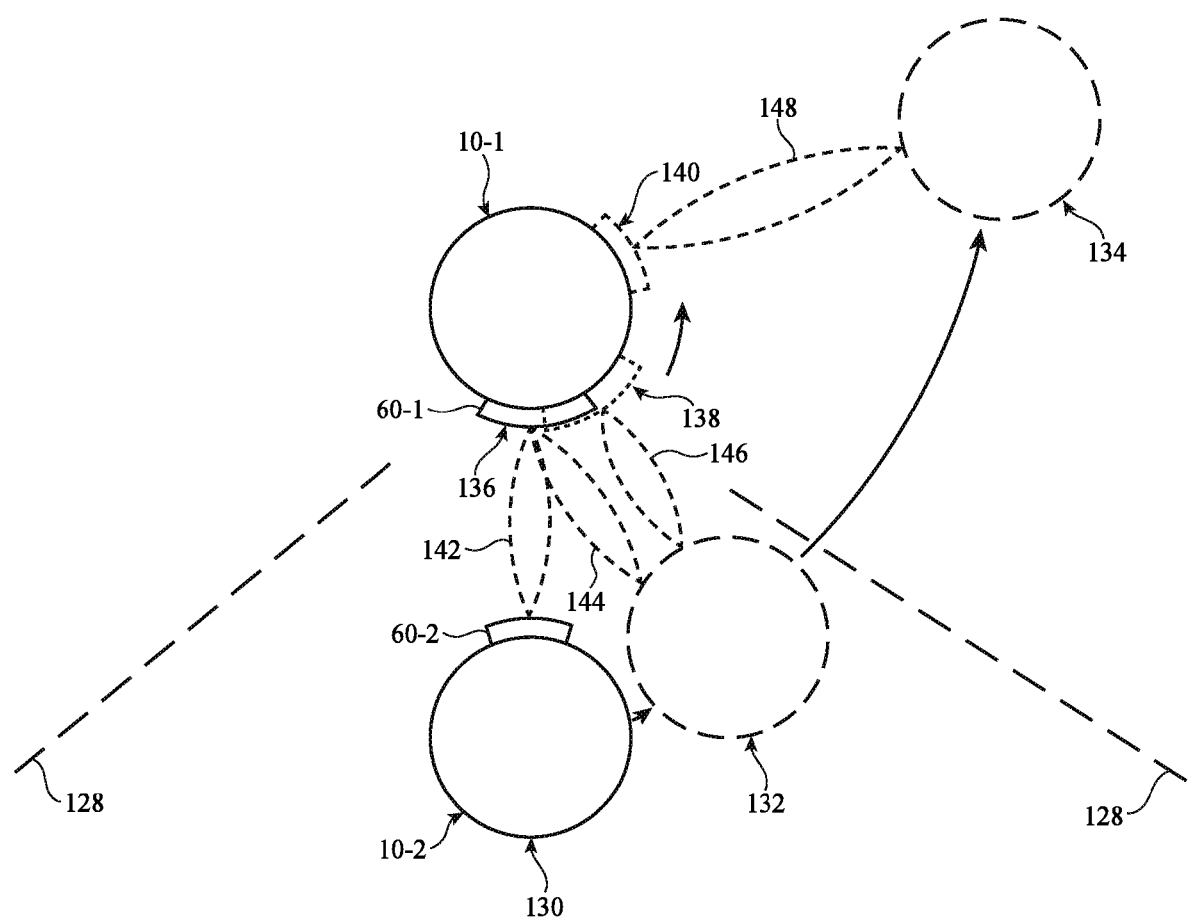
FIG. 8 is top-down view showing how an illustrative electronic device may establish a line-of-sight communication link with an external device in accordance with an embodiment.

FIG. 8 is a top-down diagram showing how devices 10-1 and 10-2 may establish and maintain a line-of-sight communications link (e.g., millimeter wave link 8) as device 10-2 moves over time. As shown in FIG. 8, device 10-2 may initially be at location 130. Control circuitry 14 on device 10-1 may gather any desired combination of performance metric data, sensor data (e.g., optical camera data, orientation data, etc.), wireless performance metric data, and position information (e.g., GPS data transmitted by device 10-2) to track the location of device 10-2.

Device 10-1 may include antenna array 60-1 at initial position 136. In the example of FIG. 8, antenna array 60-1 at position 136 is already directed towards device 10-2 at location 130 (e.g., position 130 lies within the field of view of array 60-1). As such, no mechanical adjustment of the position of array 60-1 is required. Control circuitry 14 on device 10-1 may perform beam steering operations to point the beam of antenna array 60-1 towards array 60-2 on device 10-2, as shown by beam sector 142 (e.g., while processing steps 110 and 112 of FIG. 7).

After directing array 60-1 to device 10-2, millimeter wave communications link 8 (e.g., a bidirectional millimeter wave link) may be established between device 10-1 and array 60-2 on device 10-2 at location 130 (e.g., while performing step 114 of FIG. 7).

Over time, device 10-2 may move from location 130 to another location such as location 132. Control circuitry 14 may identify that device 60-2 has moved while performing step 116 of FIG. 7 (e.g., when the gathered wireless performance metric data falls outside of a range of predetermined values, when a camera identifies that device 10-2 has moved, when an orientation sensor detects a change in orientation of device 10-1, when device 10-1 receives information from an orientation sensor on device 10-2 identifying that the orientation of device 10-2 has changed, etc.). Control circuitry 14 may thereafter identify an updated location of device 10-2 while performing step 117 of FIG. 7.

In this example where device 10-2 has moved to location 132, location 132 remains within the field of view of array 60-1 (e.g., as defined by field of view boundaries 128). Because device 10-2 is remains within the field of view of array 60, the beam can be steered towards device 10-2 at location 132 (e.g., to sector 144) without mechanically adjusting array 60-1 (e.g., while processing step 122 of FIG. 7). In another suitable arrangement, beam steering may be omitted and control circuitry 14 may control components 42 to mechanically move array 60-1 to position 138. In this scenario, the same phase settings for phase controllers 62 may be used while array 60-1 is at location 136 and while array 60-1 is at location 138. After array 60-1 has been moved to position 138, the beam may align with position 132 as shown by sector 146. In general, any desired combination of beam steering and mechanical adjustment may be used (e.g., array 60-1 may be adjusted to location 138 while also steering beam 146 towards device 10-2 at location 132).

Over time, device 10-2 may move from location 132 to another location such as location 134. In this example, location 134 is outside of the field of view of array 60-1 at position 136. As such, beam steering alone may be incapable of re-establishing millimeter wave communications link 8 between devices 10-1 and 10-2 after device 10-2 has moved to position 134. Control circuitry 14 may therefore control components 42 to mechanically re-position array 60-1 to updated position 140. When array 60-1 is at position 140, location 134 lies within the field of view of array 60-1. Once mechanically moved to position 140, control circuitry 14 may perform beam steering to align the beam with position 134, as shown by sector 148. In another suitable arrangement, control circuitry 14 may move array 60-1 so that the current beam aligns with position 134 without performing additional beam steering operations.

In the example of FIG. 8, movement of array 60-1 from location 136 to location 140 is performed by rotating array 60-1 about the center of device 10-1. In particular, mechanical adjustment components 42 may move the entirety of device 10-1 or a portion of device 10 to direct array 60-1 to the location of device 10-2. This is merely illustrative. In general, any desired combination of translational and/or rotational movement of array 60 about any desired axes may be used to re-direct array 60-1 towards device 10-2.

By mechanically adjusting array 60-1 using adjustable components 42, the effective field of view of array 60-1 may be extended to any desired angle. In this way, additional arrays that would otherwise cover the areas outside of the initial field of view of a single array may be omitted, thereby reducing power consumption and increase processing efficiency in device 10-1 relative to scenarios where multiple arrays are used. The example shown in FIG. 8 depicts movement of array 60-1 on device 10-1. This is merely illustrative. If desired, control circuitry on device 10-2 may mechanically adjust array 60-2 and/or perform beam steering to track array 60-1 on device 10-1 similarly to array 60-1 on device 10-1.

Figure 9:
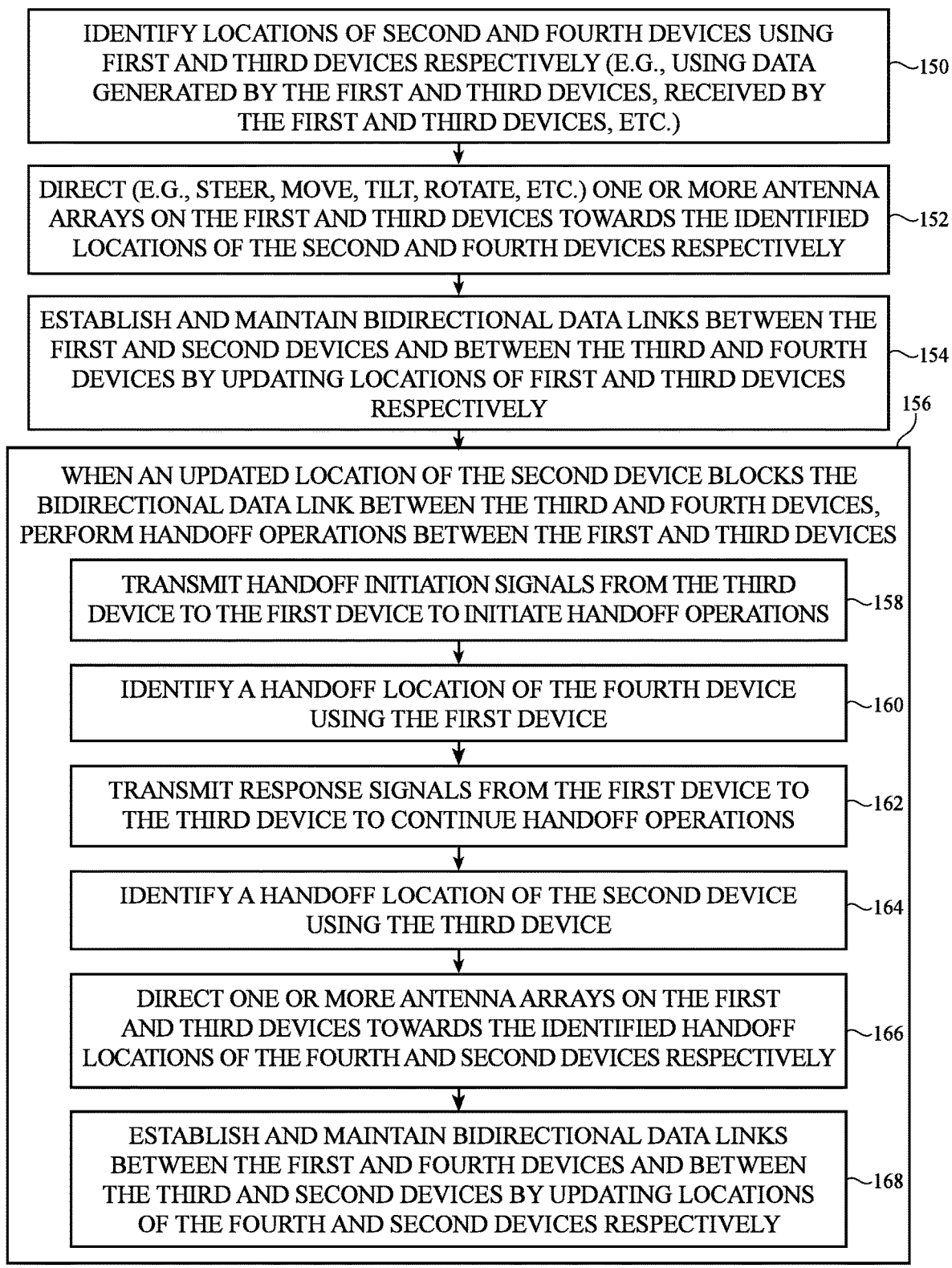
FIG. 9 is a flow chart of illustrative steps that may be performed by a pair of electronic devices in establishing line-of-sight communication links with a pair of external devices in accordance with an embodiment.

The example of FIG. 8 shows two devices (e.g., device 10-1 and 10-2). However, if desired, multiple electronic devices may coexist simultaneously in a particular environment. FIG. 9 is a flow chart of illustrative steps that may be processed by two electronic devices in establishing and maintaining communications operations with two external electronic devices. The steps of FIG. 9 may be performed by two electronic devices (e.g., a first electronic device 10-1 and a third electronic device 10-3) in communicating with two external electronic devices (e.g., a second electronic device 10-2 and a fourth electronic device 10-4). In some configurations, devices 10-1, 10-2, and 10-4 may be external to device 10-3 (e.g., devices 10-1, 10-2, and 10-4 may be referred to herein as external devices 10-1, 10-2, and 10-4 with respect to device 10-3). Devices 10-1, 10-2, 10-3, and 10-4 may be devices of the same type or devices of different types. If desired, any suitable configuration may be used for devices 10-1, 10-2, 10-3, and 10-4.

For example, external devices 10-1, 10-2, and 10-4 may be separate and distinct devices from device 10-3 (e.g., external devices 10-1, 10-2, and 10-4 may each include respective housing structures separate from the housing of device 10-3, may include separate processing and input-output circuitry, etc.). In general, external devices 10-1, 10-2, and 10-4 may include any desired wireless communications circuitry that is separate from (e.g., external to) electronic device 10-3. The components of external devices 10-1, 10-2, and 10-4 need not be enclosed within a corresponding electronic device housing in some scenarios. If desired, external devices 10-1, 10-2, and 10-4 may be accessories to device 10-3 or device 10-3 may be an accessory device to external devices 10-1, 10-2, and 10-4 (e.g., an accessory such as a remote control that provides data to an electronic device and/or receives data from an electronic device, a wireless speaker that plays audio data generated by an electronic device, a wireless headset, a wireless keyboard, a wireless trackpad, a wireless mouse, etc.).

In general, devices 10-3 and 10-4 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station (e.g., a wireless router or other equipment for routing communications between other wireless devices and a larger network such as the internet or a cellular telephone network), a desktop computer, a keyboard, a gaming controller, a computer mouse, a mousepad, a trackpad or touchpad, equipment that implements the functionality of two or more of these devices, or other electronic equipment having wireless communications capabilities.

Devices 10-1, 10-2, 10-3, and 10-4 may each include one or more phased antenna arrays (e.g., device 10-1 may include one or more phased arrays 60 of antennas 40). As an example, device 10-1 may include an array 60-1, device 10-2 may include an array 60-2, device 10-3 may include an array 60-3, and device 10-4 may include an array 60-4. Devices 10-1 and 10-2 may sometimes be referred to herein as a first pair of devices, whereas devices 10-3 and 10-4 may sometimes be referred to herein as a second pair of devices.

At step 150, first device 10-1 may identify a position (e.g., a relative location or orientation) of second device 10-2 using sensor data generated by sensor circuitry on either device or using any other desired device position data (e.g., as previously described in connection with step 110 of FIG. 7). In another suitable arrangement, control circuitry 14 on first device 10-1 may perform beam sweeping operations to identify the relative position of second device 10-2. Similarly, third device 10-3 may identify a position of fourth device 10-4.

At step 152, first device 10-1 may direct a signal beam (e.g., from antenna array 60-1) toward second device 10-2 at the identified location. In particular, control circuitry 14 in first device 10-1 may mechanically adjust substrate 80 of array 60-1 (e.g., using positioner 42) and/or electronically steer array 60-1 (e.g., using circuitry 70) to direct the beam towards second device 10-2. Similarly, third device 10-3 may direct a signal beam toward fourth device 10-4 by mechanically adjusting array 60-3 and/or by electronically steering array 60-3.

At step 154, once the beam of array 60-1 on first device 10-1 has been mechanically and/or electronically directed towards second device 10-2, first device 10-1 may establish and maintain a first bidirectional data link with second device 10-2 (e.g., as previously described in connection with steps 114-124 of FIG. 7). Similarly, after the beam of array 60-3 on third device 10-3 has been mechanically and/or electronically directed towards fourth device 10-4, third device 10-3 may establish and maintain a second bidirectional data link with fourth device 10-4. Devices 10-1 and 10-2 may perform steps 150-154 in parallel with, concurrently with, or sequentially with devices 10-3 and 10-4, for example. The first bidirectional data link may be maintained between devices 10-1 and 10-2 independently from the second bidirectional link between devices 10-3 and 10-4.

In practice, one or more devices (e.g., one or more device 10-1, 10-2, 10-3, and 10-4) may be mobile (i.e., portable). Over time, one of the devices may move to a location such that the device blocks communications between two of the other devices, thereby impairing the corresponding communication link (as shown in step 156). In the example of FIG.

9, second device 10-2 may move to a location that blocks a communications path (e.g., a line of sight path) between devices 10-3 and 10-4. In this scenario, devices 10-1 and 10-3 may perform device handoff operations. The device handoff operations may involve swapping devices in each communication link so that every device has a corresponding device with which to communicate.

Handoff operations may generally be initiated whenever a device loses communications access with a corresponding external device. If care is not taken, the impaired communications link may disrupt the operation of both devices. As an example, third device 10-3 may require data generated from fourth device 10-4 and fourth device 10-4 may require data generated from third device 10-3 to perform desired processing operations. When the communications link between third device 10-3 and fourth device 10-4 is dropped or impaired (e.g., by second device 10-2 blocking the line of sight between devices 10-3 and 10-4), the performance of both devices 10-3 and 10-4 may be adversely affected (e.g., processing operations on both devices may be halted). Performing handoff operations may allow third device 10-3 to provide second device 10-2 and fourth device 10-4 to provide first device 10-1 with the necessary data for performing the respective processing operations in the event that the link between devices 10-1 and 10-2 or the link between devices 10-3 and 10-4 is impaired.

As shown in FIG. 9, handoff operations may include steps 158-168. At step 158, third device 10-3 may transmit a handoff initiation signal to first device 10-1 indicating that the communications link between third device 10-3 and fourth device 10-4 has been lost or is unsatisfactory (e.g., as determined by wireless performance metrics, sensor data, etc.). The communications link between devices 10-3 and 10-4 may be unsatisfactory due to second device 10-2 moving to a location that blocks the line of sight between devices 10-3 and 10-4, for example. The handoff initiation signal may be transmitted over a wired or wireless communications link (e.g., communications links 6 or 8 of FIG. 1).

The handoff initiation signal may request that first device 10-1 begin searching for fourth device 10-4. If desired, the initiation signal transmitted by third device 10-3 may include information identifying the last known location of fourth device 10-4, identification information associated with fourth device 10-4, or any information that may assist first device 10-1 in locating fourth device 10-4 (e.g., sensor data, beam scanning data, etc.). If desired, fourth device 10-4 may transmit location and/or identification data signals directly to first device 10-1 in response to the link between devices 10-3 and 10-4 becoming impaired.

At step 160, first device 10-1 may use sensor data generated by sensor circuitry on device 10-1 and/or beam sweeping operations to identify the location of fourth device 10-4 (e.g., as previously described in connection with step 110 of FIG. 7). If desired, first device 10-1 may identify the location of fourth device 10-4 based on information received from fourth device 10-4 and/or third device 10-3 (e.g., information in the handoff initiation signal received from third device 10-3 while processing step 158).

At step 162, once first device 10-1 has identified the location of fourth device 10-4, device 10-1 may transmit a response signal to third device 10-3 indicating that first device 10-1 has successfully located fourth device 10-4. First device 10-1 may transmit information identifying the location of second device 10-2 to third device 10-3. If desired, first device 10-1 may also transmit information identifying the location of fourth device 10-4 to third device 10-3.

At step 164, third device 10-3 may identify a location of second device 10-2 using sensor data generated by sensor circuitry and/or beam sweeping operations (e.g., as previously described in connection with step 110 of FIG. 7). If desired, third device 10-3 may identify the location of second device 10-2 using information received from first device 10-1 while processing step 162. If desired, third device 10-3 may send an acknowledgement signal to first device 10-1 indicating that the location of second device 10-2 has been identified by third device 10-3.

At step 166, once first device 10-1 has successfully located fourth device 10-4 and third device 10-3 has located second device 10-2, first device 10-1 may direct a signal beam (e.g., from antenna array 60-1) toward the identified location of fourth device 10-4 using mechanical adjustments and/or beam steering. Similarly, third device 10-3 may direct a signal beam (e.g., from antenna array 60-3) toward the identified location of second device 10-2 using mechanical adjustments and/or beam steering.

At step 168, first device 10-1 may establish and maintain a bidirectional millimeter wave wireless data link with fourth device 10-4 and second device 10-2 may establish and maintain a bidirectional millimeter wave wireless data link with third device 10-3 (e.g., similar to as described in connection with step 154). In this way, devices 10-1 and 10-4 may form a first updated device pair and devices 10-2 and 10-3 may form a second updated device pair. If desired, the updated device pairs may only be formed when first device 10-1 receives an acknowledgement signal from third device 10-3.

The steps of FIG. 9 may be performed by devices 10-1 and 10-3 in transmitting and/or receiving millimeter wave signals to perform handoff operations. The steps of FIG. 9 may also be performed by devices 10-2 and 10-4 or any desirable combination of devices prior to, concurrent with, or after devices 10-1 and 10-3 perform the steps of FIG. 9 (e.g., in response to any impaired communications links).

Figure 10:
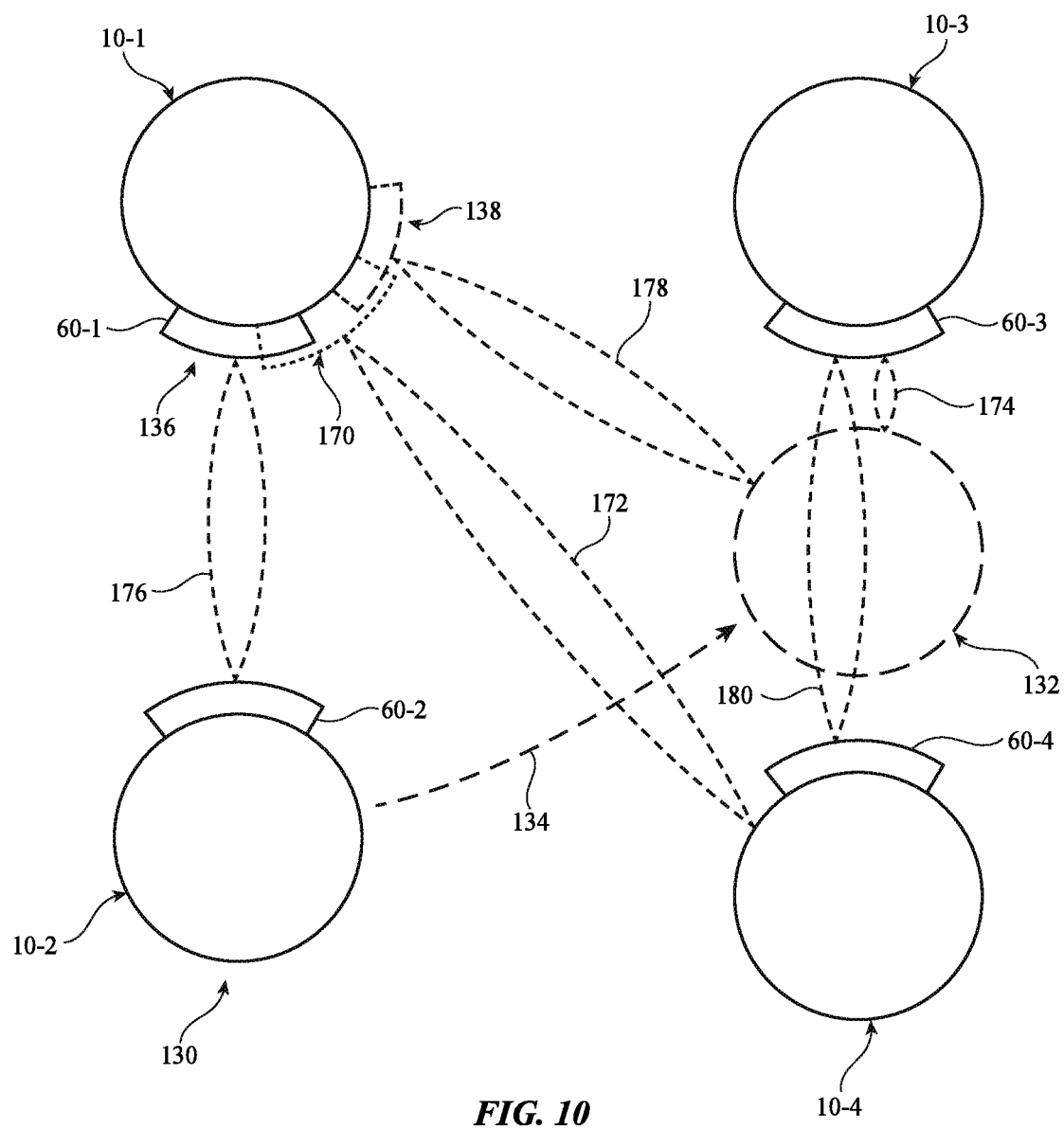
FIG. 10 is top-down view showing how an illustrative pair of electronic devices may establish line-of-sight communication links with a pair of external devices in accordance with an embodiment.

FIG. 10 is a top-down diagram showing how devices 10-1, 10-2, 10-3, and 10-4 may establish and maintain line-of-sight communications links (e.g., millimeter wave links 8) as device 10-2 moves over time.

As described in connection with steps 150-154 of FIG. 9, first device 10-1 may establish and maintain a first millimeter wave communications link with device 10-2 at location 130 (e.g., over beam 176 between device 10-1 and device 10-2 at location 130). Third device 10-3 may also establish and maintain a second millimeter wave communications link with fourth device 10-4 (e.g., over beam 180 between device 10-3 and device 10-4). Over time, device 10-2 may move from location 130 to location 132. In response to the movement of second device 10-2 to location 132, first device 10-1 may maintain line-of-sight communications link 8 by directing the signal beam toward second device 10-2 as shown by sector 178. For example, device 10-1 may mechanically move array 60-1 from location 136 to location 138. While the bidirectional link may be maintained between devices 10-1 and 10-2 without disruption in this example, second device 10-2 at location 132 may block the line of sight between devices 10-3 and 10-4. This may impair the millimeter wave communications link between devices 10-4 and device 10-3. Third device 10-3 may subsequently perform handoff operations (e.g., by performing step 156 in FIG. 9).

To initiate handoff operations, third device 10-3 may send an initiation signal to first device 10-1 that indicates that the link between devices 10-3 and 10-4 is impaired (e.g., while processing step 158 of FIG. 9). After receiving the initiation signal from third device 10-3, first device 10-1 may use sensor data or any other desired information to identify the location of fourth device 10-4 relative to first device 10-1 (e.g., while processing step 160 of FIG. 9). After identifying the location of fourth device 10-4, first device 10-1 may transmit a response signal to third device 10-3 (e.g., while processing step 162 of FIG. 9). Third device 10-3 may receive the response signal, which may identify that first device 10-1 has successfully identified the location of fourth device 10-4. Third device 10-3 may subsequently use sensor data or any other desired information to identify a location of second device 10-2 relative to third device 10-3 (e.g., while processing step 164 of FIG. 9). After locating second device 10-2, third device 10-3 may transmit a response signal (e.g., an acknowledgement signal) back to first device 10-1, if desired.

In a scenario where first device 10-1 cannot find a location of fourth device 10-4 (e.g., no response signal is received by third device 10-3 from first device 10-1) and/or third device 10-3 cannot find a location of second device 10-2 no response signal is received by first device 10-1 (e.g., no response signal is received by first device 10-1 from third device 10-3), first device 10-1 and third device 10-3 may communicate with each other indicating that second device 10-2 cannot be found by device 10-3, as an example. This may revert any changes made thus far in the handoff operations and thereby end the handoff operations. If desired, third device 10-3 (or any other impaired device) may subsequently attempt to locate other devices and similarly perform handoff operations.

After receiving the acknowledgement signal, first device 10-1 may move array 60-1 from location 138 to location 170. Fourth device 10-4 may move array 60-4 toward first device 10-1 to establish and maintain a communications link with first device 10-1. As described above in connection with step 112 of FIG. 7, any combination of beam steering and mechanical array adjustments may be used to establish and maintain the communications link between devices 10-1 and 10-4 (e.g., as shown by beam sector 172). Similarly, device 10-3 may also perform mechanical and/or beam steering adjustments to direct the beam of array 60-3 towards the identified location of second device 10-2 (e.g., while processing step 166 of FIG. 9). Third device 10-3 may subsequently establish and maintain a communications link with second device 10-2 (e.g., as shown by beam sector 174).

In this way, devices 10-4 and 10-2 may continue to receive data from another device (e.g., devices 10-3 and 10-1 respectively) even though one of the devices has moved to block the line of sight between the other two devices. This may, for example, ensure that any required data may still be received by devices 10-1 and 10-2 in real time. If desired, device 10-1 may reconnect with device 10-2 and device 10-3 may reconnect with device 10-4 once device 10-2 moves away from location 132.

The example of FIGS. 9 and 10 in which communications are performed between four devices 10 are merely illustrative. If desired, any number of devices may form communication links simultaneously. As an example, a network of two, three, five, or more than five devices may form interconnecting communication links with one another.

Control circuitry 14 on devices 10 may be configured to perform these operations (e.g., the operations of FIGS. 7-10) using hardware (e.g., dedicated hardware or circuitry) and/or software (e.g., code that runs on the hardware of device 10). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 14. The processing circuitry may include application-specific integrated circuits with processing circuitry, one or more microprocessors, or other processing circuitry.

The foregoing is merely illustrative and various modifications can be made to the described embodiments. The foregoing embodiments may be implemented individually or in any combination.

What is claimed is:

1. An electronic device configured to communicate with an external device, the electronic device comprising:
   a plurality of antennas configured to transmit and receive millimeter wave signals;
   sensor circuitry configured to generate sensor data; and
   control circuitry coupled to the sensor circuitry, wherein the control circuitry is configured to:
      determine whether the external device is located within a field of view of at least one antenna in the plurality of antennas, and
      direct, based on the sensor data and in response to determining that the external device is located outside of the field of view, the millimeter wave signals towards the external device by mechanically adjusting an orientation of the at least one antenna in the plurality of antennas, wherein the control circuitry is configured to gather wireless performance metric data associated with the received millimeter wave signals and wherein the control circuitry is configured to determine whether the external device is located within the field of view based on the gathered wireless performance metric data.

2. The electronic device defined in claim 1, wherein the gathered wireless performance metric data comprises error rate data associated with the received millimeter wave signals.

3. The electronic device defined in claim 2, wherein the control circuitry is configured to determine whether the external device is located within the field of view by determining whether the error rate data is within a predetermined range of error rate values and, in response to determining that the error rate data is outside of the predetermined range of error rate values, determining that the external device is located outside of the field of view.

4. The electronic device defined in claim 3, wherein the error rate data comprises error rate data selected from the group consisting of: frame error rate data, bit error rate data, and packet error rate data.

5. The electronic device defined in claim 1, wherein the wireless performance metric data comprises data selected from the group consisting of: received power data, receiver sensitivity data, receive band noise data, received signal strength indicator (RSSI) data, adjacent channel leakage ratio (ACLR) data, received signal code power (RSCP) data, reference symbol received power (RSRP) data, signal-to-interference ratio (SINR) data, signal-to-noise ratio (SNR) data, and error vector magnitude (EVM) data.

6. The electronic device defined in claim 1, wherein the control circuitry is configured to identify a location of the external device based on the sensor data and wherein the sensor circuitry comprises sensor circuitry selected from the group consisting of: image sensor circuitry and device orientation sensor circuitry.

7. The electronic device defined in claim 1, further comprising:
beam steering circuitry coupled to the plurality of antennas, wherein the plurality of antennas are arranged in a phased antenna array coupled to the beam steering circuitry, and wherein the control circuitry is configured to, in response to determining that the external device is located within the field of view, control the beam steering circuitry to steer the millimeter wave signals towards the external device.

8. The electronic device defined in claim 1, further comprising:
beam steering circuitry coupled to the plurality of antennas, wherein the plurality of antennas are arranged in a phased antenna array coupled to the beam steering circuitry, and wherein the control circuitry is configured to control the beam steering circuitry to steer the millimeter wave signals towards the external device after mechanically adjusting the orientation of the at least one antenna in the plurality of antennas.

9. A wireless electronic device configured to wirelessly communicate with an external device, the wireless electronic device comprising:
antennas configured to transmit and receive millimeter wave signals;
a mechanical positioner coupled to the antennas;
control circuitry coupled to the mechanical positioner, wherein the control circuitry is configured to:
gather error rate values from the received millimeter wave signals,
determine whether the gathered error rate values are within a predetermined range of error rate values, the predetermined range of error rate values being associated with a satisfactory wireless link quality, and
in response to determining that the gathered error rate values are outside of the predetermined range of error rate values, control the mechanical positioner to adjust a mechanical orientation of the antennas, wherein the antennas are arranged in a phased antenna array; and
beam steering circuitry coupled to the phased antenna array, wherein the control circuitry is further configured to, in response to determining that the gathered error rate values are within the predetermined range of error rate values, control the beam steering circuitry to steer the millimeter wave signals towards the external device.

10. The wireless electronic device defined in claim 9, wherein the control circuitry is further configured to, in response to determining that the gathered error rate values are outside of the predetermined range of error rate values, control the beam steering circuitry to steer the millimeter wave signals subsequent to controlling the mechanical positioner to adjust the mechanical orientation of the antennas.

11. The wireless electronic device defined in claim 10, wherein the mechanical positioner is configured to adjust a mechanical orientation of an entirety of the phased antenna array.

12. The wireless electronic device defined in claim 9 wherein the control circuitry is configured to, while continuing to gather the error rate values, control the beam steering circuitry to steer the millimeter wave signals over a plurality of beam steering angles until the gathered error rate values are within the predetermined range of error rate values.

13. The wireless electronic device defined in claim 9, wherein the error rate values comprise error rate values selected from the group consisting of: frame error rate values, bit error rate values, and packet error rate values.

14. A wireless electronic device configured to wirelessly communicate with first, second, and third external devices, the wireless electronic device comprising:
a phased antenna array configured to perform millimeter wave communications with the first external device over a first millimeter wave link; and
control circuitry coupled to the phased antenna array, wherein the control circuitry is configured to:
determine whether the first millimeter wave link satisfies a wireless performance criterion, and
in response to determining that the first millimeter wave link fails to satisfy the wireless performance criterion, performing millimeter wave communications with the second external device over a second millimeter wave link and instructing the third external device to perform millimeter wave communications with the first external device over a third millimeter wave link.

15. The wireless electronic device defined in claim 14, wherein the control circuitry is configured to gather error rate data associated with the first millimeter wave link and is configured to determine whether the first millimeter wave link satisfies the wireless performance criterion by comparing the gathered error rate data to a predetermined range of error rate values.

16. The wireless electronic device defined in claim 15, wherein the error rate data comprises error rate data selected from the group consisting of: frame error rate data, bit error rate data, and packet error rate data.

17. The wireless electronic device defined in claim 14, wherein instructing the third external device to perform millimeter wave communications with the first external device comprises:
instructing the third external device to locate the first external device; and
receiving a response signal from the third external device when the first external device has been located by the third external device.

* * * * *